(12) United States Patent
Pertierra et al.

(10) Patent No.: US 12,736,859 B2
(45) Date of Patent: Sep. 15, 2026

(54) PROJECTION SYSTEM AND METHOD FOR ETENDUE UTILIZATION

(71) Applicant: Dolby Laboratories Licensing Corporation, San Francisco, CA (US)

(72) Inventors: Juan Pablo Pertierra, Fishers, IN (US); Martin J. Richards, Gig Harbor, WA (US); Barret Lippey, Foster City, CA (US); Trevor Davies, Walnut Creek, CA (US); John Frederick Arntsen, Manchester-by-the-Sea, MA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 294 days.

(21) Appl. No.: 18/548,208

(22) PCT Filed: Mar. 10, 2022

(86) PCT No.: PCT/US2022/019822
§ 371 (c)(1),
(2) Date: Aug. 28, 2023

(87) PCT Pub. No.: WO2022/192584
PCT Pub. Date: Sep. 15, 2022

(65) Prior Publication Data

US 2024/0142861 A1 May 2, 2024

Related U.S. Application Data

(60) Provisional application No. 63/215,755, filed on Jun. 28, 2021, provisional application No. 63/160,374, filed on Mar. 12, 2021.

(30) Foreign Application Priority Data

Jul. 1, 2021 (EP) .................................... 21183142

(51) Int. Cl.
*G03B 21/00* (2006.01)
*H04N 9/31* (2006.01)

(52) U.S. Cl.
CPC ......... *G03B 21/008* (2013.01); *H04N 9/3152* (2013.01)

(58) Field of Classification Search
CPC .. G03B 21/005; G03B 21/006; G03B 21/008; G03B 21/28; G03B 21/145;
(Continued)

(56) References Cited

U.S. PATENT DOCUMENTS 6,499,026 B1 12/2002 Rivette
7,889,430 B2 2/2011 El-Ghoroury
(Continued)

FOREIGN PATENT DOCUMENTS

CN 106200236 A 7/2018
CN 111147832 A 2/2022
(Continued)

*Primary Examiner* — Sultan Chowdhury

(57) ABSTRACT

A projection system for etendue utilization includes a first light source configured to emit a light, the light including a first etendue component and a second etendue component, wherein the first etendue component has a lower etendue than the second etendue component, a first projection optics configured to project a first image on a screen, a second projection optics configured to project a second image on the screen, and an etendue splitter component. The etendue splitter component is configured to receive the light from the light source, extract, from the light, the first etendue component and the second etendue component, provide the first etendue component to the first projection optics, and provide the second etendue component to the second projection optics.

18 Claims, 11 Drawing Sheets

(58) Field of Classification Search

CPC .............. G03B 21/208; G03B 21/2006; G03B 21/2013; G03B 21/2033; G03B 21/2053; H04N 9/315; H04N 9/3102; H04N 9/3105; H04N 9/3108; H04N 9/3141; H04N 9/3152; H04N 9/3155; H04N 9/3158; H04N 9/3161

See application file for complete search history.

(56) References Cited

U.S. PATENT DOCUMENTS

| | | | | |
|---|---|---|---|---|
| 9,110,294 | B2 | 8/2015 | Perkins | |
| 9,891,439 | B2 | 2/2018 | Hu | |
| 10,228,106 | B2 | 3/2019 | Hager | |
| 10,386,709 | B2 | 8/2019 | Richards | |
| 10,404,955 | B2 | 9/2019 | Komanduri | |
| 10,416,539 | B2 | 9/2019 | Pertierra | |
| 10,462,437 | B2 | 10/2019 | Damberg | |
| 10,488,746 | B2 | 11/2019 | Pertierra | |
| 10,531,055 | B2 | 1/2020 | Richards | |
| 10,698,302 | B2 | 6/2020 | Pertierra | |
| 10,830,416 | B2 | 11/2020 | Hu | |
| 10,880,528 | B1 | 12/2020 | Perkins | |
| 10,904,496 | B2 | 1/2021 | Richards | |
| 10,928,643 | B2 | 2/2021 | Chikahisa | |
| 11,269,241 | B2 | 3/2022 | Pertierra | |
| 11,457,185 | B2 | 9/2022 | Richards | |
| 11,726,394 | B2 | 8/2023 | Pertierra | |
| 2006/0221305 | A1* | 10/2006 | Magarill | H04N 9/315 353/31 |
| 2009/0165126 | A1 | 6/2009 | Jung | |
| 2010/0309439 | A1 | 12/2010 | Bi | |
| 2011/0234923 | A1* | 9/2011 | Yamagishi | H04N 9/3111 348/757 |
| 2013/0250546 | A1 | 9/2013 | Hu | |
| 2013/0301010 | A1* | 11/2013 | Huang | G02B 30/25 353/8 |
| 2016/0091783 | A1 | 3/2016 | Hu | |
| 2020/0012177 | A1 | 1/2020 | Chen | |
| 2020/0033709 | A1 | 1/2020 | Sakata | |
| 2020/0103636 | A1* | 4/2020 | Maeda | G02B 27/1006 |
| 2020/0249492 | A1 | 8/2020 | Maes | |
| 2021/0141238 | A1* | 5/2021 | Pertierra | G02B 26/008 |
| 2022/0043274 | A1* | 2/2022 | Moore | G03B 21/208 |
| 2022/0191440 | A1 | 6/2022 | Pertierra | |
| 2023/0026771 | A1 | 1/2023 | Pablo | |
| 2023/0341754 | A1 | 10/2023 | Pertierra | |

FOREIGN PATENT DOCUMENTS

| | | | |
|---|---|---|---|
| EP | 2988158 | A1 | 2/2016 |
| EP | 2988170 | A1 | 2/2016 |
| JP | 2016522536 | A | 7/2016 |
| WO | 2022165441 | A1 | 8/2022 |

* cited by examiner 608b
610b
612
610a
608a
606
b
614
606a
604
103
602
600
102

PROJECTION SYSTEM AND METHOD FOR ETENDUE UTILIZATION

CROSS-REFERENCE TO RELATED APPLICATIONS

This application is a U.S. National Stage application under U.S.C. 371 of International Application No. PCT/US2022/019822, filed on Mar. 10, 2022, which claims priority of the following priority application: European Patent Application No. 21183142.5, filed Jul. 1, 2021, U.S. Provisional Patent Application No. 63/215,755, filed Jun. 28, 2021, and U.S. Provisional Patent Application No. 63/160,374, filed Mar. 12, 2021, which are hereby incorporated by reference.

BACKGROUND

1. Field of the Disclosure

This application relates generally to projection systems and methods of driving a projection system.

2. Description of Related Art

Digital projection systems typically utilize a light source and an optical system to project an image onto a surface or screen. The optical system includes components such as mirrors, lenses, waveguides, optical fibers, beam splitters, diffusers, spatial light modulator (SLMs), and the like. Some emerging imaging technologies use beam steering technology, which is achieved with phase modulation, tilting mirror devices, rising mirror/piston devices, and the like. In such a system, the quality of the output image is dependent on the etendue of the light, which is a measure of the effective spatial and angular size of the light source.

BRIEF SUMMARY OF THE DISCLOSURE

Various aspects of the present disclosure relate to circuits, systems, and methods for projection display using both high and low etendue components of a light source.

In one exemplary aspect of the present disclosure, there is provided a projection system for etendue utilization, the projection system comprising: a light source configured to emit a light, the light including a first etendue component and a second etendue component, a first projection optics configured to project a first image on a screen, a second projection optics configured to project a second image on the screen, and an etendue splitter component. The etendue splitter component is configured to: receive the light from the light source, extract, from the light, the first etendue component and the second etendue component, provide the first etendue component to the first projection optics, and provide the second, etendue component to the second projection optics.

In another exemplary aspect of the present disclosure, there is a provided a projection system for etendue utilization, the projection system comprising: a light source configured to emit a first light having a first amount of etendue, a projection device configured to project a first image on a screen, and at least one optical component. The at least one optical component is configured to: receive the first light, extract a second light having a second amount of etendue lower than the first amount of etendue, and provide the second light to the projection device.

In another exemplary aspect of the present disclosure, there is provided a projection system for etendue utilization, the projection system comprising: a light source configured to emit a first light having a first etendue, and an etendue component, wherein the etendue component is configured to receive the first light and extract, from the first light, a second light having a second etendue and a third light having a third etendue, wherein the second etendue is lower than the first etendue, and wherein the first etendue is lower than the third etendue. The projection system comprises: a first light modulator configured to receive the second light, to modulate the second light in a manner associated with a first image, and to output the modulated second light, and a second light modulator configured to receive the modulated second light from the first light modulator and to receive the third light from the etendue component, to modulate the third light and additionally modulate the modulated second light in a manner associated with the first image, and to output the modulated third light and additionally modulated second light.

In another exemplary aspect of the present disclosure, there is provided a method for etendue utilization within a projection system, the projection system including a light source configured to emit a light, the light including a first etendue component and a second etendue component, wherein the first etendue component has a lower etendue than the second etendue component, a first projection optics configured to project a first image on a screen, a second projection optics configured to project a second image on the screen, and an etendue splitter component, the method comprising: receiving the light from the light source, extracting, from the light, the first etendue component and the second etendue component, providing the first etendue component to the first projection optics, and providing the second etendue component to the second projection optics.

In another exemplary aspect of the present disclosure, there is provided a non-transitory computer-readable medium storing instructions that, when executed by a processor of a projection system including a light source configured to emit a light, the light including a first etendue component and a second etendue component, wherein the first etendue component has a lower etendue than the second etendue component, a first projection optics configured to project a first image on a screen, a second projection optics configured to project a second image on the screen, and an etendue splitter component, cause the projection system to perform operations comprising receiving the light from the light source, extracting, from the light, the first etendue component and the second etendue component, providing the first etendue component to the first projection optics, and providing the second etendue component to the second projection optics.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing summary is intended solely to give a general idea of various aspects of the present disclosure, and does not limit the scope of the disclosure in any way.

In the following description, numerous details are set forth, such as circuit configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that this is merely one example of an implementation. It will further be understood that the disclosed systems and methods can be used in any device in which there is a need to project light; for example, cinema, consumer and other commercial projection systems, heads-up displays, virtual reality displays, and the like.

Projection System

Figure 1:
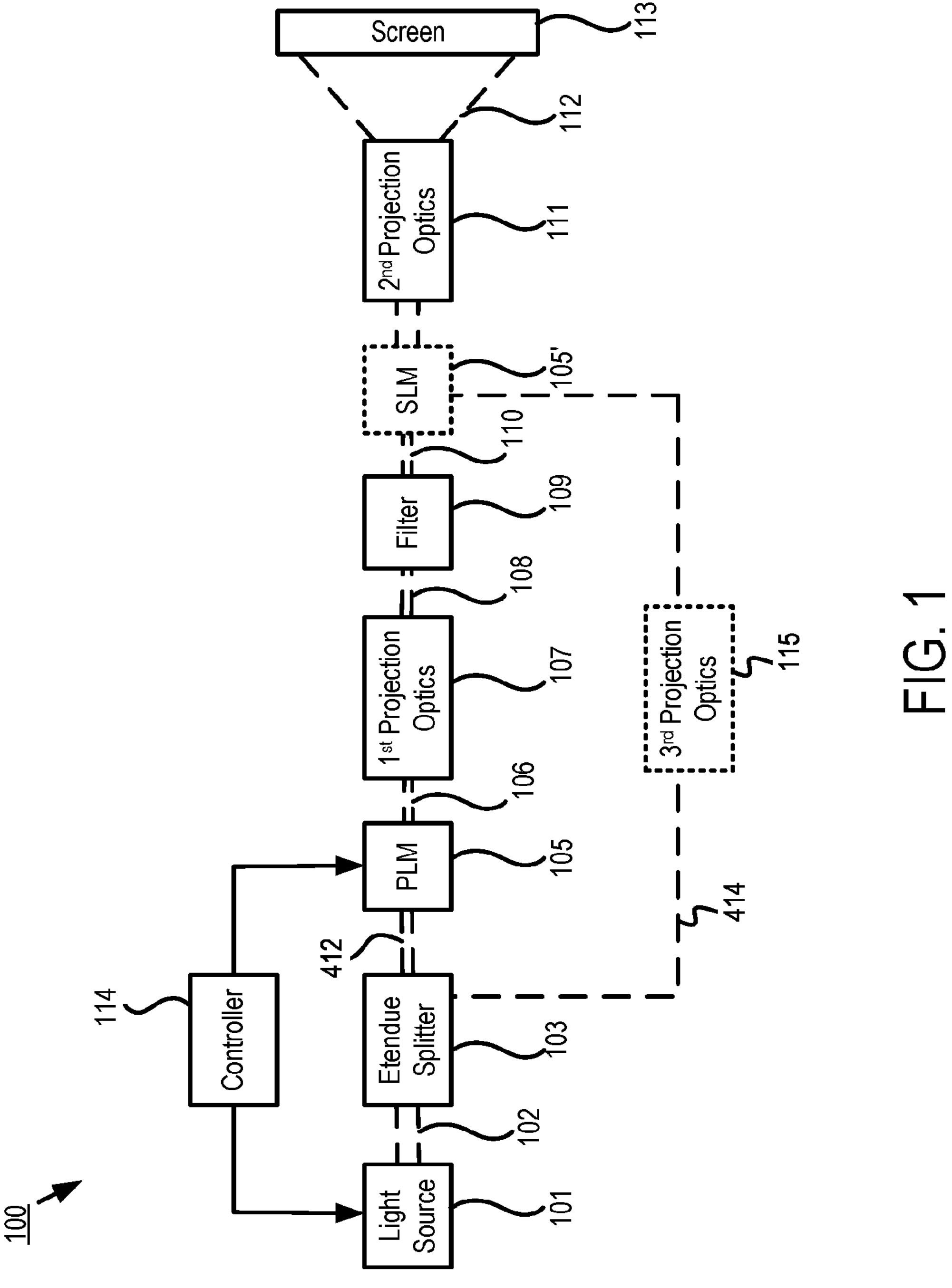
FIG. 1 illustrates a block diagram of an exemplary projection system according to various aspects of the present disclosure.

FIG. 1 illustrates a block diagram of an exemplary projection system 100 according to various aspects of the present disclosure. Specifically, FIG. 1 illustrates a projection system 100 which includes a light source 101 configured to emit a first light 102; an etendue splitter component 103 configured to receive the first light 102 and redirect it or otherwise modify it to create a first etendue component 412 and a second etendue component 414; a phase light modulator (PLM) 105 configured to apply a spatially-varying phase modulation to the first etendue component 412 and/or the second etendue component 414, thereby to steer the first etendue component 412 and/or the second etendue component 414 and generate a third light 106; first projection optics 107 configured to receive the third light 106 and redirect or otherwise modify it, thereby to generate a fourth light 108; a filter 109 configured to filter the fourth light 108, thereby to generate a fifth light 110; and second projection optics 111 configured to receive the fifth light 110 and project it as a sixth light 112 onto a screen 113. The projection system may further include an amplitude-based spatial light modulator (STM) or other additional modulators 105', illustrated in FIG. 1 with a dotted line. While the etendue splitter component 103 is illustrated as being between the light source 101 and the PLM 105, in practice the etendue splitter component 103 may be located in a separate location within the projection system 100 and after the light source 101 (i.e., between the first projection optics 107 and the filter 109, etc.). Additionally, while the second etendue component 414 is illustrated as being delivered to the SLM 105', the second etendue component 414 may be delivered to other components of the projection system 100, such as the first projection optics 107, the filter 109, or the second projection optics 111. The second etendue component 414 may be modified by a third projection optics 115, illustrated in FIG. 1 with a dotted line. The third projection optics 115 may include an integrating rod or fly-eye array configured to homogenize the second etendue component 414. In some embodiments, the first etendue component 412 is provided to the third projection optics 115, and the second etendue component 414 is provided to the PLM 105. By having one component bypass the PLM 105, the overall optical efficiency may increase.

The projection system 100 further includes a controller 114 configured to control various components of the projection system 100, such as the light source 101, the PLM 105, and/or the SLM 105', In some implementations, the controller 114 may additionally or alternatively control other components of the projection system 100, including but not limited to the etendue splitter component 103, the first projection optics 107, and/or the second projection optics 111. The controller 114 may be one or more processors such as a central processing unit (CPU) of the projection system 100. The etendue splitter component 103, the first projection optics 107, and the second projection optics 111 may respectively include one or more optical components such as mirrors, lenses, waveguides, optical fibers, beamsplitters, diffusers, and the like. The controller 114 may control the light source 101 to control brightness (e.g., dimming) based on the image content. In some implementations, the etendue splitter component 103 may be configured to dynamically split the first light 102 into the first etendue component 412 and the second etendue component 414 based on the image content, as described in more detail below. When present, SLIM 105' may be controlled by the controller 114. For example, the controller 114 may provide a control signal to the SLM 105' to control the individual modulation elements of the SLM 105'. With the exception of the screen 113, the components illustrated in FIG. 1 may be integrated into a housing to provide a projection device. Such a projection device may include additional components such as a memory, input/output ports, communication circuitry, a power supply, and the like. Components may further be split between two projectors. In some implementations, the first etendue component 412 and the second etendue component 414 are provided to separate projectors, as described in more detail below.

The light source 101 may be, for example, a laser light source, a light emitting diode (LED) array, and the like. Generally, the light source 101 is any light emitter which emits light. In some aspects of the present disclosure, the light source 101 may comprise multiple individual light emitters, each corresponding to a different wavelength or wavelength band. The light source 101 may include a fiber optic coupling, such as a single fiber coupled laser, a direct coupling, and the like. The light source 101 emits light in response to an image signal provided by the controller 114. The image signal includes image data corresponding to a plurality of frames to be successively displayed. The image signal may originate from an external source in a streaming or cloud-based manner, may originate from an internal memory of the projection system 100 such as a hard disk, may originate from a removable medium that is operatively connected to the projection system 100, or combinations thereof.

As illustrated in FIG. 1, the controller 114 controls the PLM 105, which receives light from the light source 101. The PLM 105 imparts a spatially-varying phase modulation to the light, and directs the modulated light toward the first projection optics 107. The PLM 105 may be a reflective type, in which the PLM 105 reflects incident light with a spatially-varying phase; alternatively, the PLM 105 may be of a transmissive type, in which the PLM 105 imparts a spatially-varying phase to light as it passes through the PLM 105. In some aspects of the present disclosure, the PLM 105 has a liquid-crystal-on-silicon (LCOS) architecture. In other aspects of the present disclosure, the PLM 105 has a micro-electromechanical system (MEMS) architecture such as a digital micromirror device (DMD).

Figure 2:
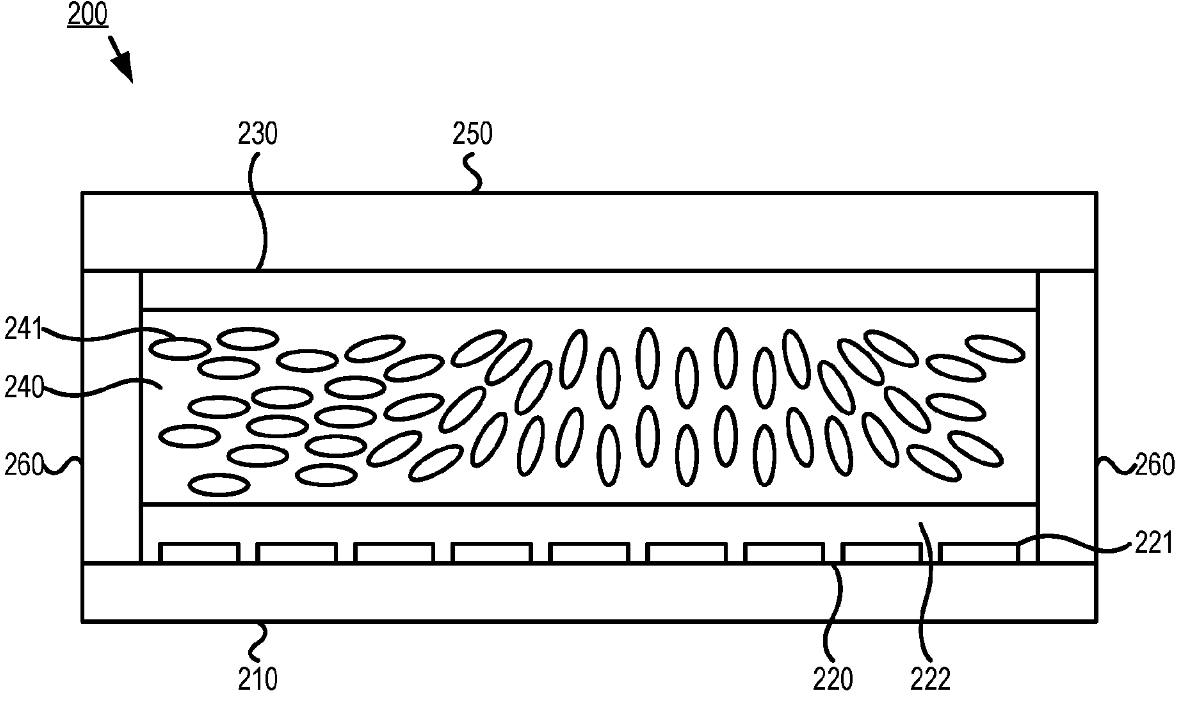
FIG. 2 illustrates an exemplary phase modulator according to various aspects of the present disclosure.

FIG. 2 illustrates one example of the PLM 105, implemented as a reflective LCOS PLM 200 and shown in a partial cross-sectional view. As illustrated in FIG. 2, the PLM 200 includes a silicon backplane 210, a first electrode layer 220, a second electrode layer 230, a liquid crystal layer 240, a cover glass 250, and spacers 260. The silicon backplane 210 includes electronic circuitry associated with the PLM 200, such as complementary metal-oxide semiconductor (CMOS) transistors and the like. The first electrode layer 220 includes an array of reflective elements 221 disposed in a transparent matrix 222. The reflective elements 221 may be formed of any highly optically reflective material, such as aluminum or silver. The transparent matrix 222 may be formed of any highly optically transmissive material, such as a transparent oxide. The second electrode layer 230 may be formed of any optically transparent electrically conductive material, such as a thin film of indium tin oxide (ITO). The second electrode layer 230 may be provided as a common electrode corresponding to a plurality of the reflective elements 221 of the first electrode layer 220. In such a configuration, each of the plurality of reflective elements 221 will couple to the second electrode layer 230 via a respective electric field, thus dividing the PLM 200 into any array of pixel elements. A pixel element may be, for example, the smallest addressable element of the PLM 200, such as each of the plurality of reflective elements 221. Thus, individual ones (or subsets) of the plurality of the reflective elements 221 may be addressed via the electronic circuitry disposed in the silicon backplane 210, thereby to modify the state of the corresponding reflective element 221. A subset of the pixel elements may be binned (or grouped) together—for control in order to alter (e.g., lower) the native resolution of the PLM 200.

The liquid crystal layer 240 is disposed between the first electrode layer 220 and the second electrode layer 230, and includes a plurality of liquid crystals 241. The liquid crystals 241 are particles which exist in a phase intermediate between a solid and a liquid; in other words, the liquid crystals 241 exhibit a degree of directional order, but not positional order. The direction in which the liquid crystals 241 tend to point is referred to as the "director." The liquid crystal layer 240 modifies incident light entering from the cover glass 250 based on the birefringence Δn of the liquid crystals 241, which may be expressed as the difference between the refractive index in a direction parallel to the director and the refractive index in a direction perpendicular to the director. From this, the maximum optical path difference may be expressed as the birefringence multiplied by the thickness of the liquid crystal layer 240. This thickness is set by the spacer 260, which seals the PLM 200 and ensures a set distance between the cover glass 250 and the silicon backplane 210, The liquid crystals 241 generally orient themselves along electric field lines between the first electrode layer 220 and the second electrode layer 230. As illustrated in FIG. 2, the liquid crystals 241 near the center of the PLM 200 are oriented in this manner, whereas the liquid crystals 241 near the periphery of the PLM 200 are substantially non-oriented in the absence of electric field lines. By addressing individual ones of the plurality of reflective elements 221 via a phase-drive signal, the orientation of the liquid crystals 241 may be determined on a pixel-by-pixel basis.

Figure 3A:
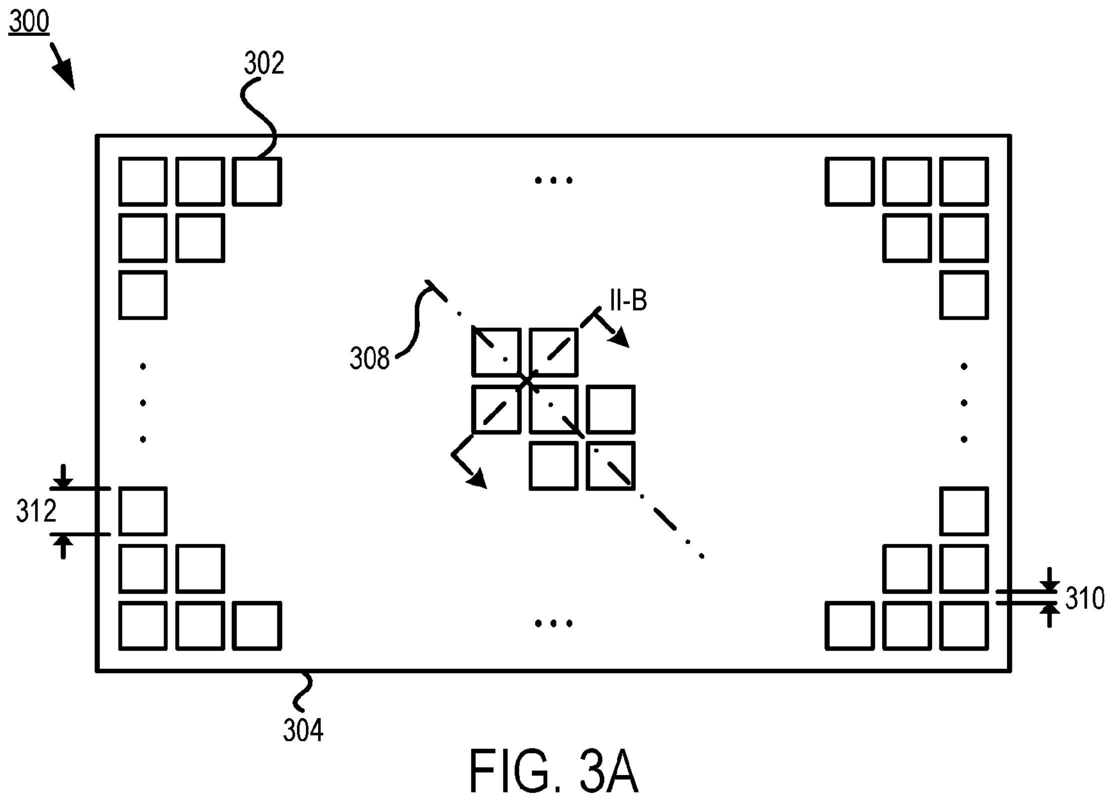
FIGS. 3A-3B illustrate views of an exemplary phase light modulator for use with various aspects of the present disclosure.
Figure 3B:
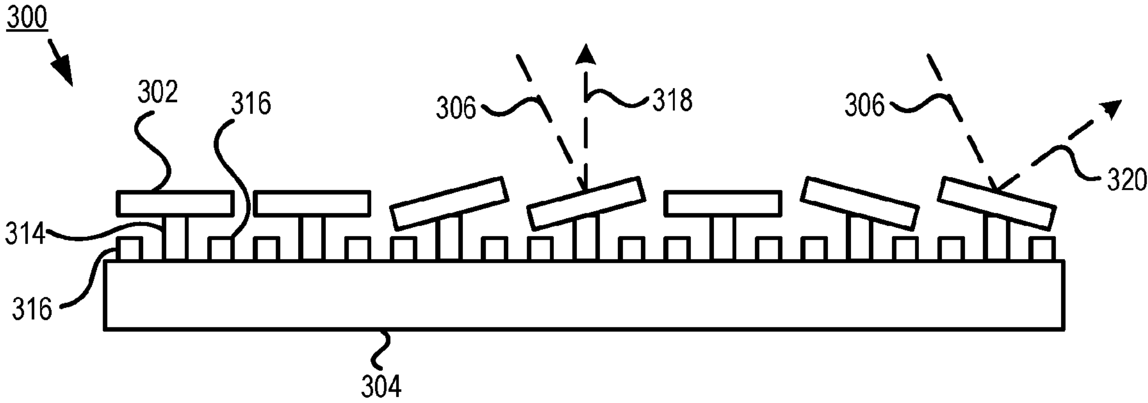

FIGS. 3A-3B show another example of PLM 105, implemented as a DMD 300. FIG. 3A illustrates a plan view of the MID 300, and FIG. 3B illustrates a partial cross-sectional view of the DMD 300. The DMD 300 includes a plurality of square micromirrors 302 arranged in a two-dimensional rectangular array on a substrate 304. In some examples, the DMD 300 may be a digital light processor (DLP) from. Texas instruments. Each micromirror 302 may correspond to one pixel of the eventual projection image, and may be configured to tilt about a rotation axis 308, shown for one particular subset of the micromirrors 302, by electrostatic or other actuation. The individual micromirrors 302 have a width 312 and are arranged with gaps of width 310 therebetween. The micromirrors 302 may be formed of or coated with any highly reflective material, such as aluminum or silver, to thereby specularly reflect light. The gaps between the micromirrors 302 may be absorptive, such that input light which enters a gap is absorbed by the substrate 304.

While FIG. 3A expressly shows only some representative micromirrors 302, in practice the DMD 300 may include many more individual micromirrors in a number equal to a resolution of the projection system 100. In some examples, the resolution may be 2K (2048×1080), 4K (4096×2160), 1080p (1920×1080), consumer 4K (3840×2160), and the like. Moreover, in some examples, the micromirrors 302 may be rectangular and arranged in the rectangular array; hexagonal and arranged in a hexagonal array, and the like. Moreover, while FIG. 3A illustrates the rotation axis 308 extending in an oblique direction, in some implementations the rotation axis 308 may extend vertically or horizontally, As can be seen in FIG. 3B, each micromirror 302 may be connected to the substrate 304 by a yoke 314, which is rotatably connected to the micromirror 302. The substrate 304 includes a plurality of electrodes 316. While only two electrodes 316 per micromirror 302 are visible in the cross-sectional view of FIG. 3B, each micromirror 302 may in practice include additional electrodes. While not particularly illustrated in FIG. 3B, the DMD 300 may further include spacer layers, support layers, hinge components to control the height or orientation of the micromirror 302, and the like.

The substrate 304 may include electronic circuitry associated with the DMD 300, such as CMOS transistors, memory elements, and the like.

Regardless of which particular architecture is used for the PILM 105, it is controlled by the controller 114 to take particular phase configurations on a pixel-by-pixel basis. Thus, the PLM 105 utilizes an array of the respective pixel elements, such as a 960×540 array. The number of pixel elements in the array may correspond to the resolution of the PILM 105. The maximum resolution may be determined by the point-spread function (PSF) of the light source 101 and on parameters of various optical components in the projection system 100. In some implementations, more than one PLM 105 may be used in conjunction with each other. In such a configuration each modulator may have a different number of pixel elements (for example, a first PLM 105 has a greater number of pixel elements than a second PLM 105). Additionally, the PLM 105 may have a lower number of pixel elements than the SLM 105'. Alternatively, the PLM 105 may have the same number or a greater number of pixel elements than the SLM 105'.

Light Etendue

Etendue is a measurement of the effective spatial and angular size of a light source, and is related to terms such as $mm^2$*sr (steradians), $M^2$ factor, or beam parameter product (BPP). For projection systems based on beam steering, the smallest focused spot size (or pixel) of the projected image is dependent on the etendue level. In this manner, the spot size increases with etendue, and high etendue results in a low image quality (e.g., halos around bright objects, reduced maximum brightness, etc.). Accordingly, such projection systems often require laser light sources with low etendue.

When a fiber-coupled laser is used as the light source 101, the etendue is based on the fiber radius and solid angle at the fiber output, as provided in Equation 1:

$$G:=\pi(R_{fiber})^2\Omega_{fiber} \tag{1}$$

Where:

G=Etendue $R_{fiber}$=Fiber Radius $\Omega_{fiber}$=Solid Angle of Fiber Output

The solid angle at the fiber output is dependent on the numerical aperture of the fiber, as provided in Equation 2:

$$\Omega_{fiber}=2\pi(1-\sqrt{-NA^2+1} \tag{2}$$

Where:

NA=Numerical Aperture of Fiber

Since the etendue is directly dependent on the radius, any given light source is composed of a plurality of etendue components. For example, when observing the center of a fiber-coupled laser and moving along the radius toward the outer limit of the laser, the measurement of etendue increases from a low etendue to a high etendue. Many projection systems, such as cinema projections, require high laser power, which may also result in a higher laser etendue. This high laser etendue leads to low efficiency and low image quality for the projector. In order to utilize high laser power while efficiently using high etendue light to drive projection systems that require lower etendue light, an etendue splitter component is implemented that breaks the laser output into several etendue components having different etendue levels.

Figure 4:
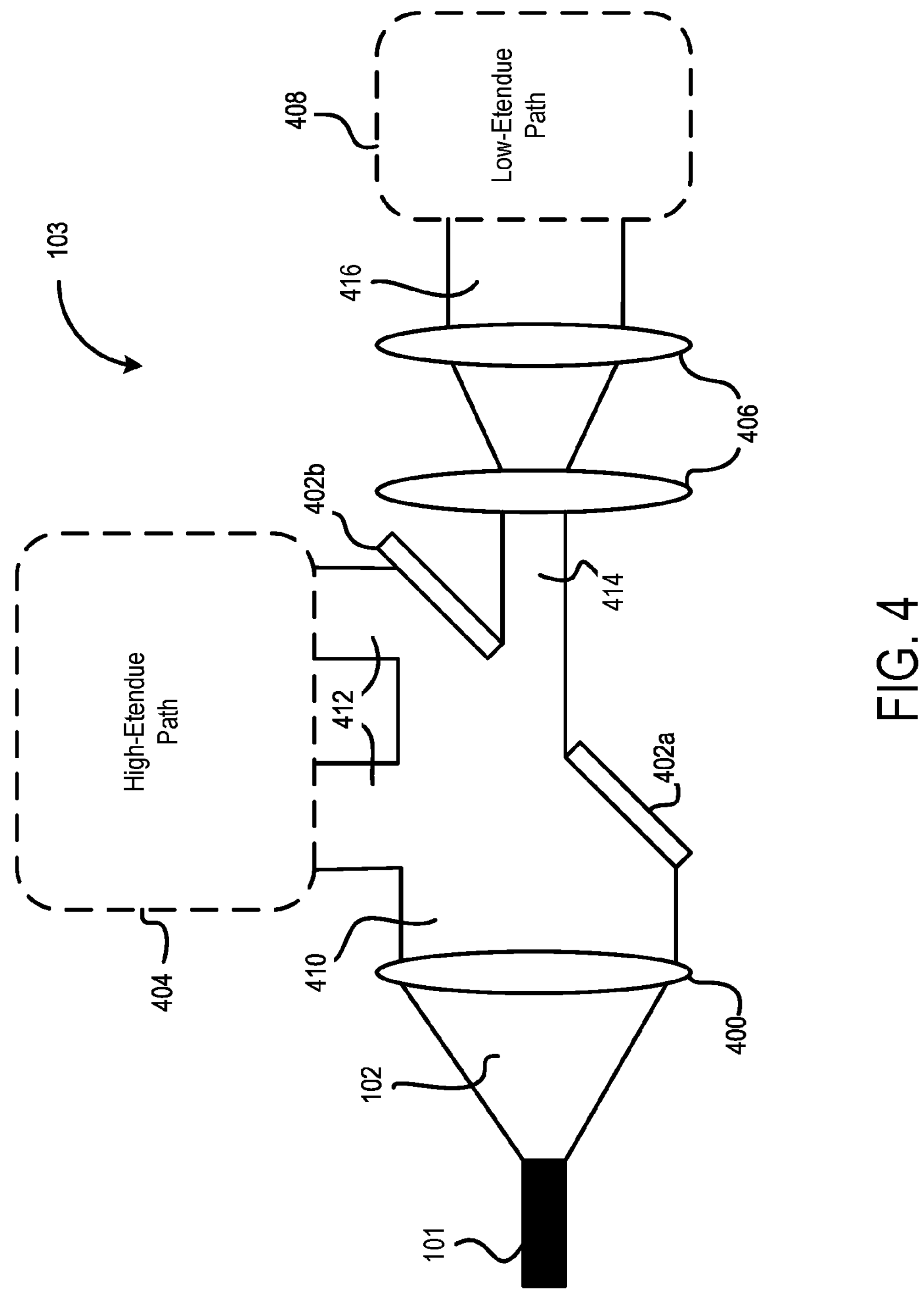
FIG. 4 illustrates a cross-section view of an exemplary etendue splitter for use with various aspects of the present disclosure.

FIG. 4 provides the etendue splitter component 103, which includes a collimator 400, a mirror 402 (shown as first mirror segment 402*a* and second mirror segment 402*b*), a high-etendue path 404, an expander 406, and a low-etendue path 408. The light source 101 emits the first light 102, which is received by the collimator 400. The collimator 400 aligns the first light 102 into a collimated light 410. The mirror 402 reflects a portion of the collimated light 410, which is projected toward the high-etendue path 404 (e.g., a first etendue path) as a first etendue component 412 (e.g., a high etendue component). The remaining portion of the collimated light 410 is a second etendue component 414 (e.g., a low etendue component), and is received by the expander 406. The expander 406 expands the second etendue component 414 into an expanded second etendue component 416, which is then received by the low-etendue path 408 (e.g., a second etendue path). In some implementations, the second etendue component 414 may be provided directly to the low-etendue path 408 without the expansion.

The mirror 402 may be in a donut shape such that a center portion of the collimated light 410 is the second etendue component 414, resulting in the first etendue component 412 being a donut shape. While the first etendue component 412 includes a hole in its center, the first etendue component 412 is considered to have its own etendue equivalent to a compact counterpart. Additionally, in some embodiments, a low-etendue component may have a hole, while the high-etendue component is compact. The center of the mirror 402 may be a circle, a rectangle, a square, or the like. When the center of the mirror 402 is a rectangle, the aspect ratio of the center of the mirror 402 may match the aspect ratio of the PLM 105. By having the aspect ratio of the center of the mirror 402 match with the aspect ratio of the PLM 105, less light is wasted and a greater amount of the second etendue component 414 is utilized. The resulting uniform illumination on the PLM 105 when the ratios match improves image quality by eliminating artifacts arising from the non-uniform illumination that occurs when the aspect ratios do not match.

Additionally, in some implementations, the mirror 402 may be dynamically adjustable to adjust the size and/or aspect ratio of the center based on the image content (for example, by moving sections of the mirror 402 along a track, by electrically controlling reflection characteristics of the mirror, etc.). Accordingly, the etendue splitter component 103 may be capable of being in several different states, each state having a different ratio of the first etendue component 412 to the second etendue component 414. In some arrangements, the center of the mirror 402 (or a mirror reflecting second etendue component 414) may have an aspect ratio that is substantially similar to the aspect ratio of PLM 105 (or other light modulator receiving second etendue component 414), where substantially similar is understood to mean that, if the widths of the center of the mirror 402 and PLM 105 were scaled to be identical, then the height of the center of the mirror 402 would be within 10% of the height of the PLM 105.

Additional implementations of the etendue splitter component 103 are possible. For example, a similar mirror 402 may be used on a smaller scale (e.g., with a mirror pinhole). In one embodiment, the high-etendue path 404 includes a fiber that homogenizes the first etendue component 412, removing the donut shape. The first etendue component 412 may be homogenized by other means, such as with integrating rods, diffusers, or fly-eye optics. In other implementations, a Fourier filter may be used to achieve angular filleting of the beam. One of the first etendue component 412 and the second etendue component 414 may be discarded based on the image content and/or the projector requirements. In such an implementation, the second etendue component 414 is reflected off a mirror, while the first etendue component 412 merely continues through to the high-etendue path 404 or is manipulated by additional optics (such as the expander 406 or other lenses configured to manipulate the size of the first etendue component 412). In another implementation, the mirror 402 is a first mirror that reflects the first etendue component 412 at a first angle, and the center of the mirror 402 includes a second mirror configured to reflect the second etendue component 414 at a second angle. Each embodiment may include altered or additional optics such that the first etendue component 412 and the second etendue component 414 are sent to the desired downstream components in the desired form.

Figure 5:
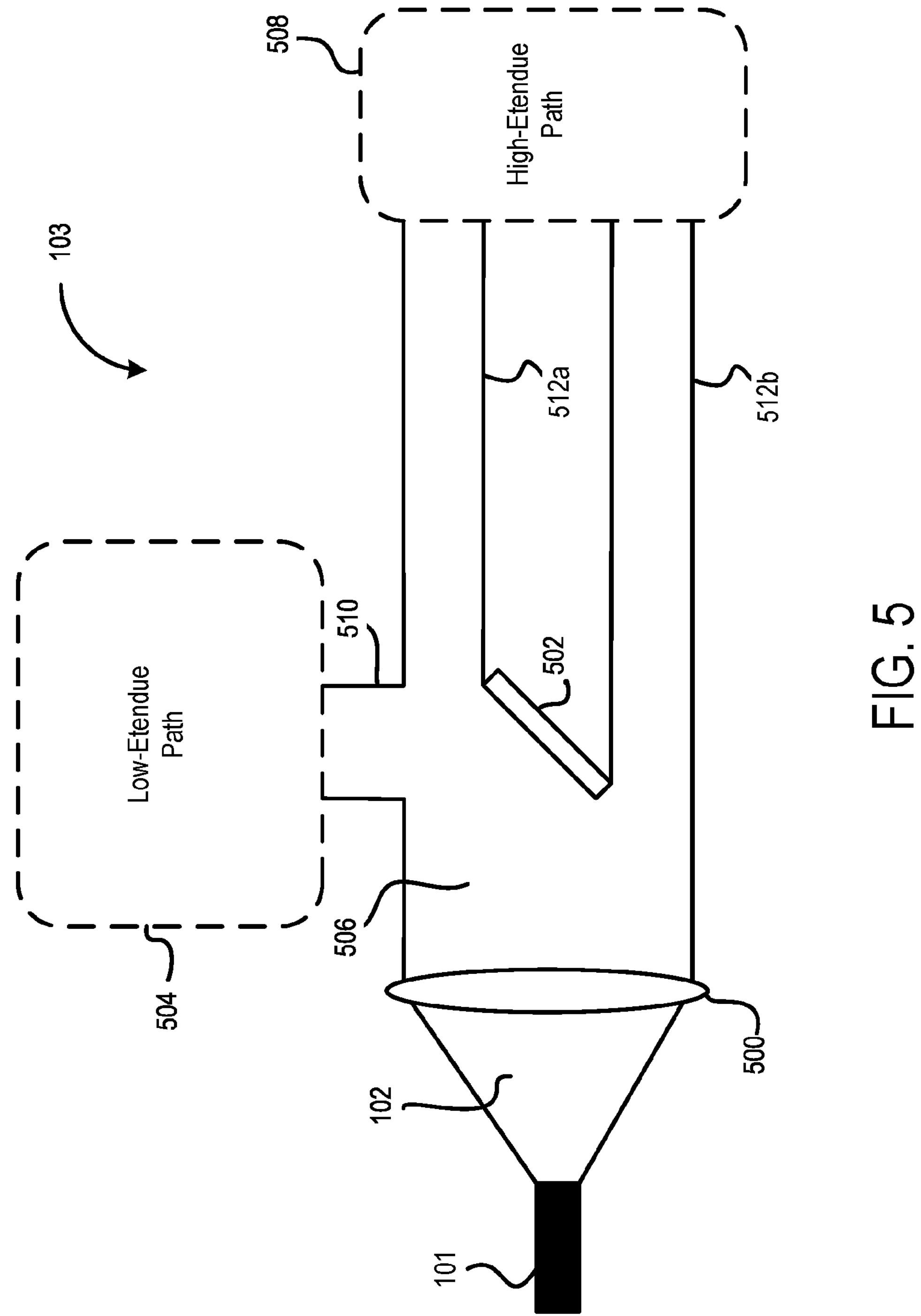
FIG. 5 illustrates a cross-section view of another exemplary etendue splitter for use with various aspects of the present disclosure.

In one implementation, a mirror may reflect the center of the collimated light 410 (e.g., an inverse mirror of the mirror 402). FIG. 5 provides the etendue splitter component 103 according to such an implementation. The etendue splitter component 103 of FIG. 5 includes a collimator 500, a mirror 502, a low-etendue path 504, and a high-etendue path 508. The light source 101 emits the first light 102, which is received by the collimator 500. The collimator 500 aligns the first light 102 into a collimated light 506. The mirror 502 reflects a portion of the collimated light 506, which is projected toward the low-etendue path 504 as a first etendue component 510 (e.g., a low etendue component). The remaining portion of the collimated light 506 is a second etendue component 512 (e.g., a high etendue component, illustrated as first high etendue component 512*a* and second high etendue component 512*b*). The second etendue component 512 enters the high-etendue path 508. The first high etendue component 512*a* and the second high etendue component 512*b* may be homogenized as they move downstream, as described above.

Figure 6:
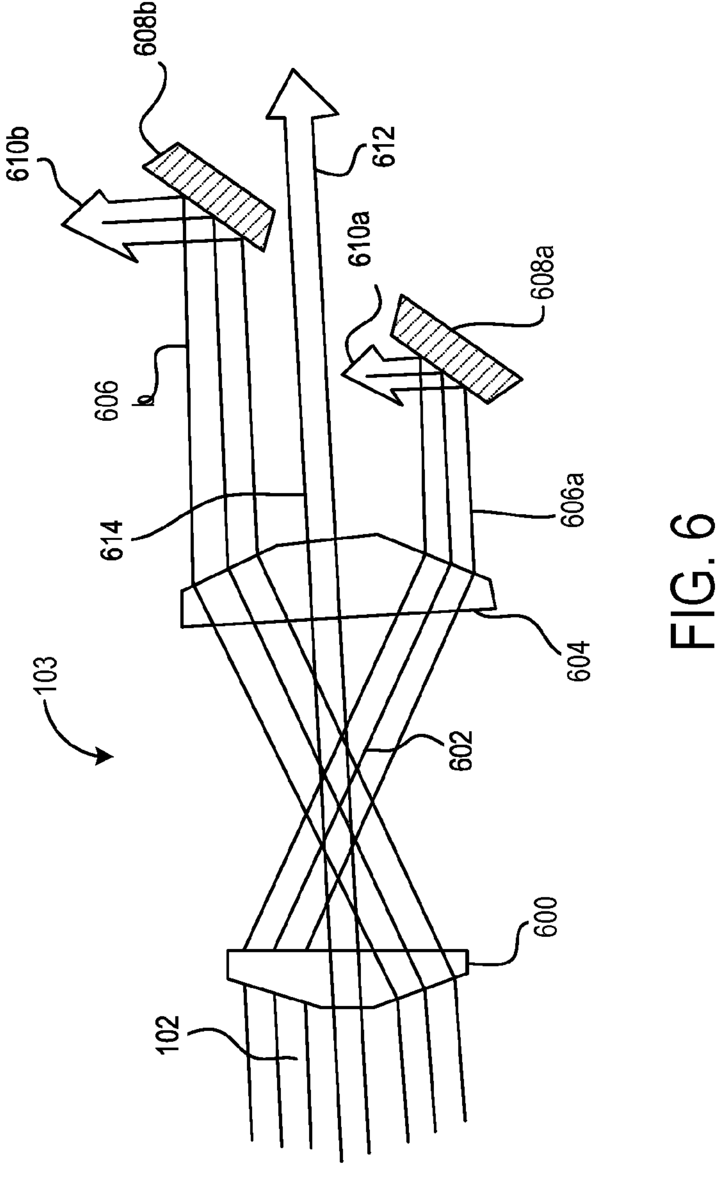
FIG. 6 illustrates a cross-section view of another exemplary etendue splitter for use with various aspects of the present disclosure.

FIG. 6 provides the etendue splitter component 103 according to another implementation. The etendue splitter component 103 of FIG. 6 includes a first collimator 600, a second collimator 604, a first axi con 608*a*, and a second axicon 608*b* (referred to collectively as axicons 608). The first collimator 600 receives the first light 102. The first collimator 600 aligns the first light 102 into a first collimated light 602. The first collimated light 602 is received by the second collimator 604. The second collimator 604 aligns the first collimated light 602 into a second collimated light 614. The second collimated light includes a first etendue component 606 and a second etendue component 612. The second etendue component 612 may enter a high-etendue path (not shown). The first etendue component 606 may be split among two sections (a first section 606*a* and a second section 606*b*).

The first axicon 608*a* and the second axicon 608*b* may each be flat top axicons with a flat central section. The flat central section of the axicons 608 directs the first etendue component 606 to a low-etendue path (not shown). The diameter of the flat central section of the axicons 608 may be altered to accommodate precisely the amount of light needed for the low-etendue path section of the projection system 100. Outer angled sections of the axicons 608 may refract the first etendue component 606 such that the first etendue component 606 is easily directed to the low-etendue path.

Figure 7:
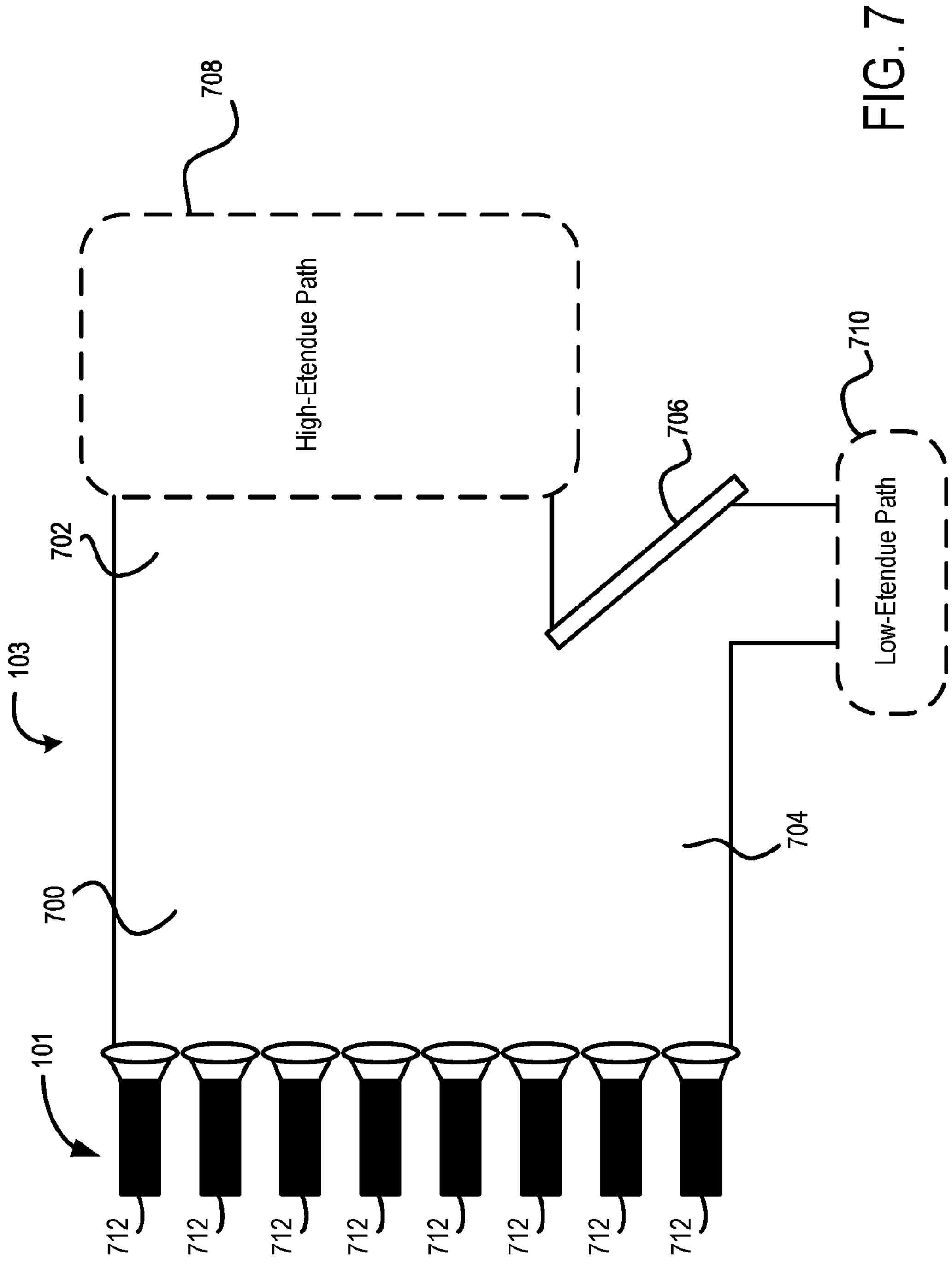
FIG. 7 illustrates a cross-section view of another exemplary etendue splitter for use with various aspects of the present disclosure.

In some implementations, etendue separation occurs directly at the light source 101. For example, FIG. 7 provides the etendue splitter component 103 according to such an embodiment. The etendue splitter component 103 includes a mirror 706, a high-etendue path 708 and a low-etendue path 710. The light source 101 is an array composed of a plurality of sources 712. The light source 101 projects a first light 700 composed of a first etendue component 702 (e.g., a high-etendue component) and a second etendue component 704 (e.g., a low-etendue component). A first subset of the plurality of sources 712 may be configured to project the first etendue component 702, and a second subset of the plurality of sources 712 may be configured to project the second etendue component 704. The selected sources 712 for each subset may be interleaved with each other. The first etendue component 702 directly enters the high-etendue path 708. The second etendue component 704 reflects off of mirror 706 and enters the low-etendue path 710. In other implementations, additional optics may be located within the light source 101 and the high-etendue path 708 and/or the low-etendue path 710.

Figure 8:
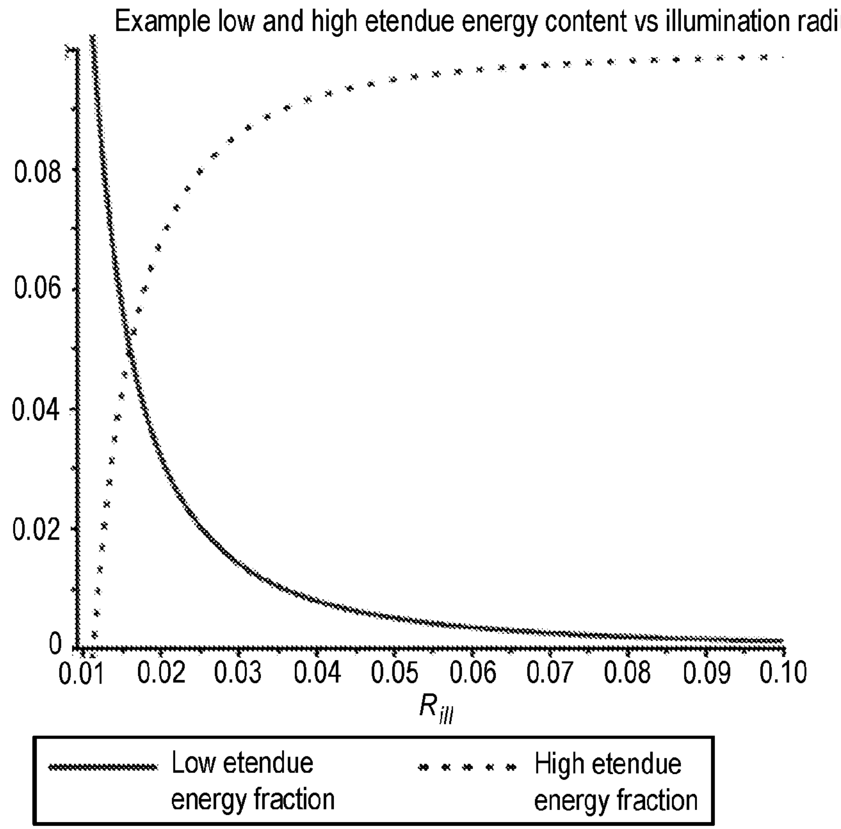
FIG. 8 illustrates a graph comparing low and high etendue ratio compared to illumination radius according to various aspects of the present disclosure.

With reference to FIG. 8, the ratio of the second etendue component 414 to the first etendue component 412 (e.g., ratio of low-etendue to high-etendue) present varies based on the size of the collimated light 410, dependent on the etendue of the light source 101, the amount of light energy desired in each path, and the size of each modulator. FIG. 8 provides a graph illustrating the relationship between the first etendue component 412 and the second etendue component 414 as the radius of the collimated light 410 increases while holding the size of the low etendue aperture in the filter constant. The size of the collimated light 410 may be selected based on the desired angle at the SLM 105'. Additionally, only a fraction of the power of the collimated light 410 arrives at the SLM 105', provided by Equation 3:

$$P_{SLM} := \frac{(W_{SLM}\rho_{SLM})(H_{SLM}\rho_{SLM})}{\pi(R_{ill})^2} \quad \text{[Equation 3]}$$

Where:

$P_{SLM}$=Power on the SLM $W_{SLM}$=SLM Width $H_{SLM}$:=SLM Height $R_{ill}$=Illumination Radius $\rho_{SLM}$=SLM Pitch Accordingly, the size of the collimated light 410 (e.g., $R_{ill}$) can be adjusted based on the desired image and requirements of the projector. While Equation 3 defines a circular beam, as previously described, other beam shapes and sizes may also be utilized (such as a square or rectangular beam).

Driving Projector System with Separate Etendue Components

Figure 9:
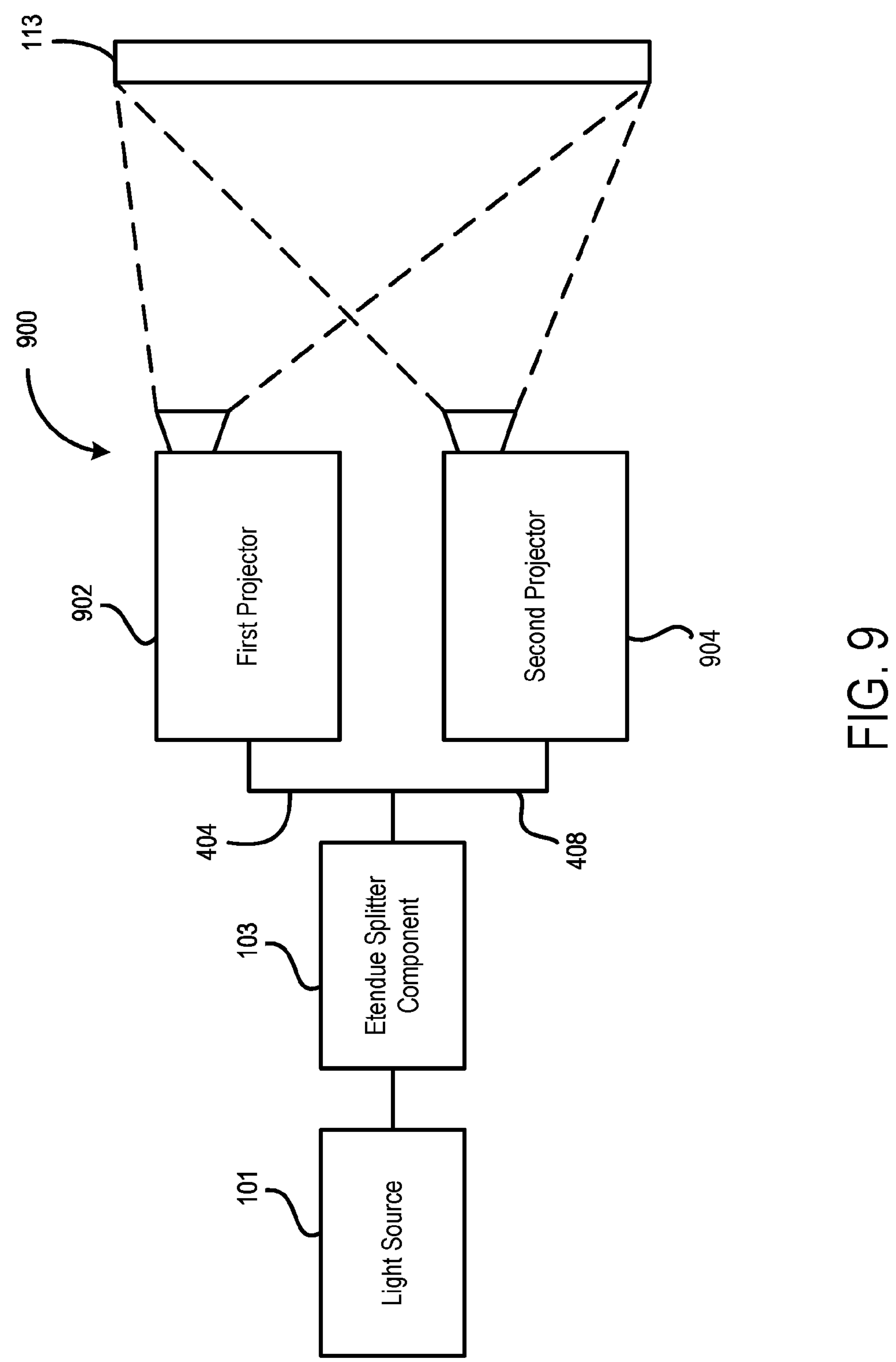
FIG. 9 illustrates a block diagram of another exemplary projection system according to various aspects of the present disclosure.

The first etendue component 412 and the second etendue component 414 (or the expanded second etendue component 416, henceforth referred to as equivalents) are provided to the high-etendue path 404 and low-etendue path 408, respectively. The high-etendue path 404 and the low-etendue path 408 may both each lead to separate projectors. For example, FIG. 9 provides an exemplary projection system 900 that includes a first projector 902 and a second projector 904. The etendue splitter component 103 is connected to the first projector 902 by the high-etendue path 404, and the etendue splitter component 103 is connected to the second projector 904 by the low-etendue path 408. The first projector 902 and the second projector 904 may both include components of the projection system 100 (shown in FIG. 1), such as the PLM 105, the first projection optics 107, the filter 109, the SLM 105', the second projection optics 111, and/or the controller 114. Accordingly, the first projector 902 may include a first projection optics, and the second projector 904 may include a second projection optics. The first projector 902 and the second projector 904 may each have different capabilities. For example, the first projector 902 may be a standard DLP high-etendue projector with a per-pixel light budget, while the second projector 904 may be a beam-steering low-etendue projector with a global light budget. Additionally, since the first projector 902 receives the first etendue component 412, the image projected by the first projector 902 on the screen 113 includes, or is based on, the first etendue component 412. Accordingly, the second projector 904 receives the second etendue component 414, and the image projected by the second projector 904 on the screen 113 includes, or is based on, the second etendue component 414.

Each projector is capable of utilizing its respective etendue component in a different manner. For example, the first projector 902 may use the high-etendue path 404 to project a component of the desired image that is generated with a normal DLP (or amplitude modulator). The second projector 904, meanwhile, may use the low-etendue path 408 to project a separate component of the desired image, which may use beam-steering to achieve higher peak highlights. The images are then projected on top of each other on the screen 113, The first projector 902 and the second projector 904 may also display the same image on the screen 113, but perform different optical operations on the first etendue component 412 and the second etendue component 414.

Figure 10:
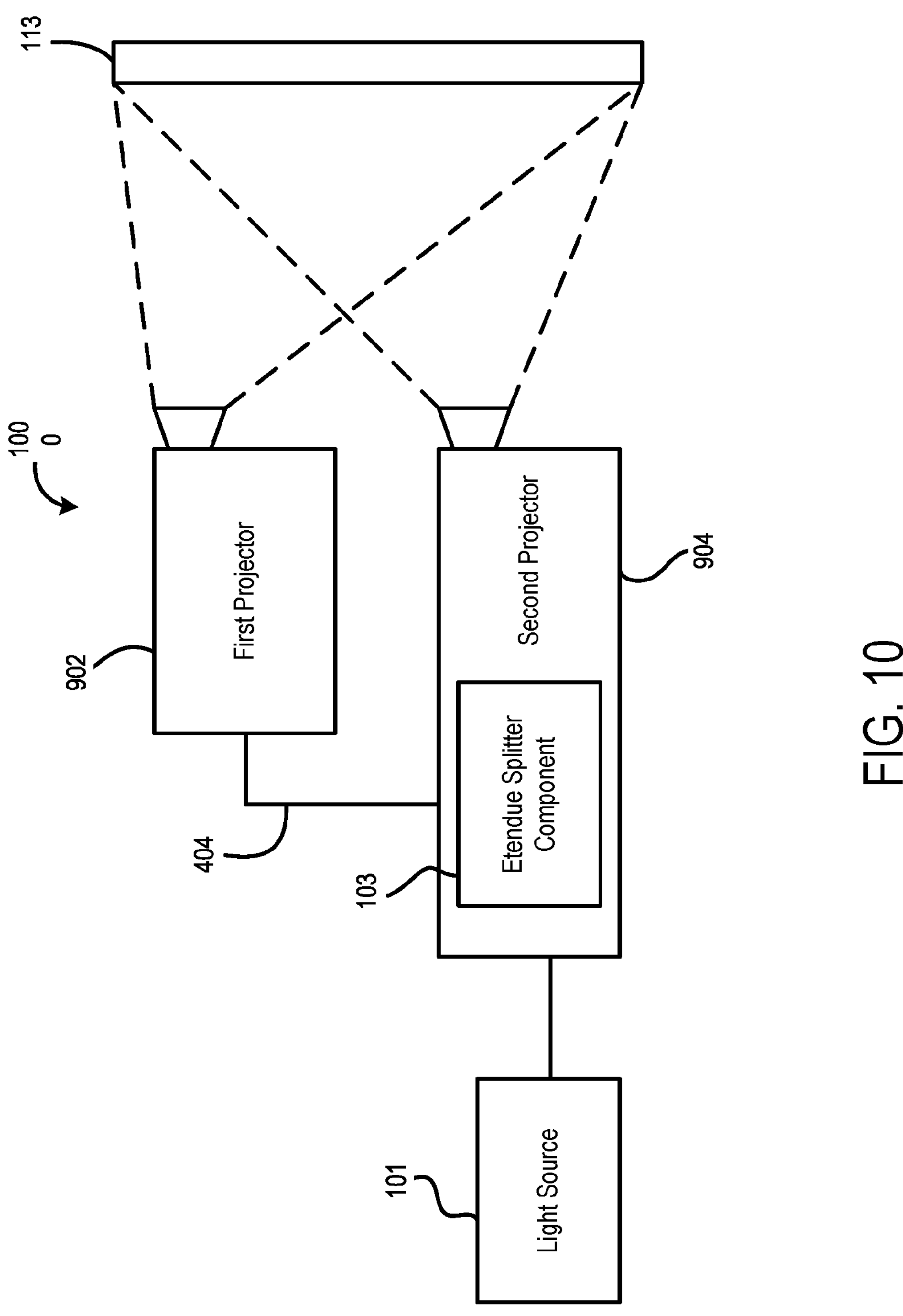
FIG. 10 illustrates a block diagram of another exemplary projection system according to various aspects of the present disclosure.

FIG. 10 provides an additional exemplary projection system 1000 in which the etendue splitter component 103 is located within the second projector 904. The low-etendue path 408 is within the second projector 904, and the second projector 904 is driven using the second etendue component 414. The first projector 902 receives the first etendue component 412 via the high-etendue path 404. In implementations where the light source 101 is fiber coupled, the fiber size from the light source 101 may be smaller than the fiber for the first projector 902 (which is a high-etendue projector). Since the first projector 902 therefore does not require a small fiber, the efficiency of the system is increased by using a larger fiber for the high-etendue path 404.

Figure 11:
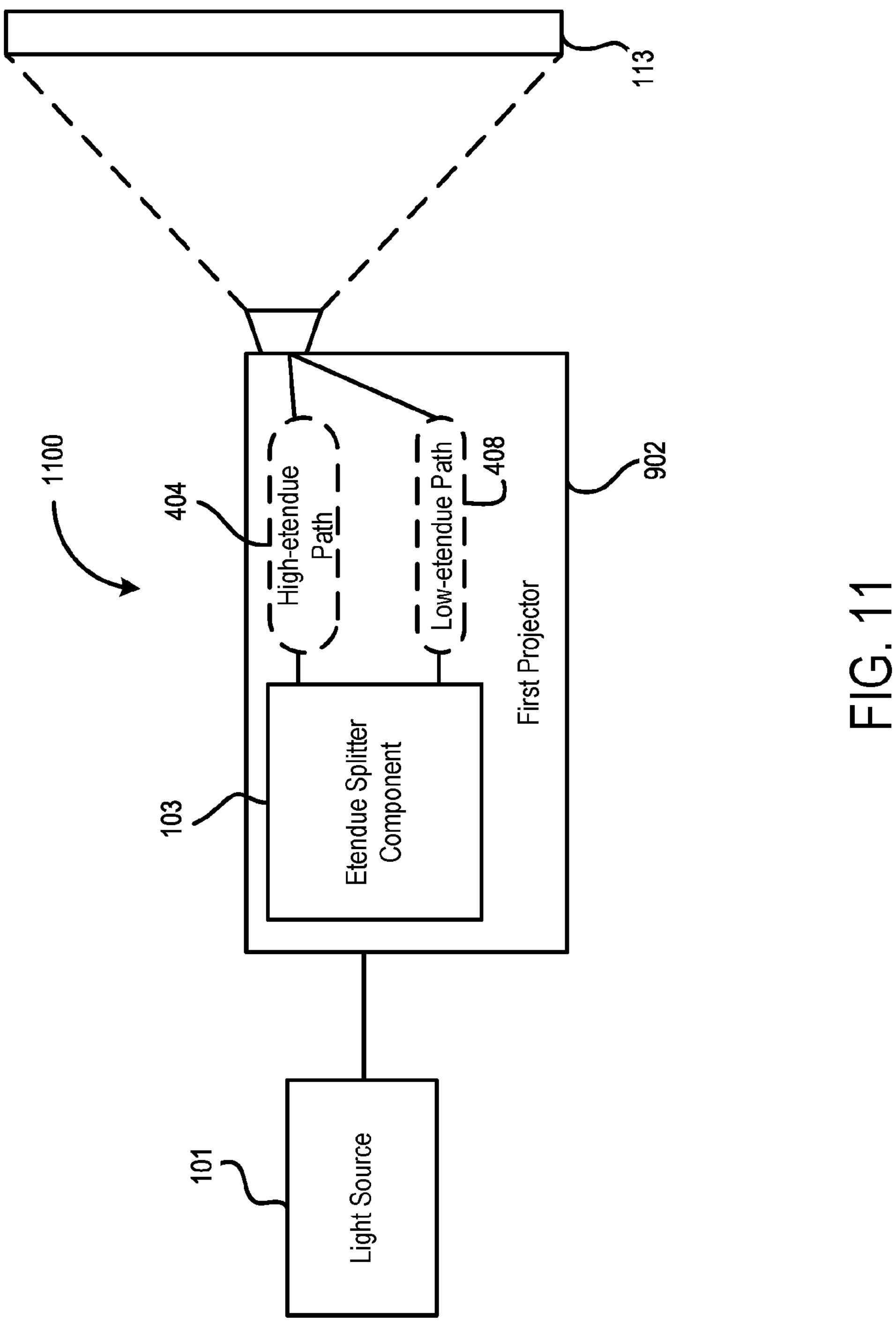
FIG. 11 illustrates a block diagram of another exemplary projection system according to various aspects of the present disclosure.

FIG. 11 provides another exemplary projection system 1100 in which the high-etendue path 404 and the low-etendue path 408 both are within first projector 902. The first etendue component 412 (from the high-etendue path 404) and the second etendue component 414 (from the low-etendue path 408) are combined for a single image output. The combination of the first etendue component 412 and the second etendue component 414 may occur anywhere within the projection system 1100 following the etendue splitter component 103. For example, the first etendue component 412 and the second etendue component 414 may both converge onto the same modulator, such as the SLM 105', or prior to the modulator, such as at the first projection optics 107. Combining the first etendue component 412 and the second etendue component 414 may be performed using any suitable technique for combining light paths, such as a wavelength-based technique, a polarization-based technique, or the like. Additional techniques for combining light paths may be found in U.S. Pat. No. 10,488,746, "Aperture Sharing for Highlight Projection," which is incorporated herein by reference in its entirety, By recombining the first etendue component 412 and the second etendue component 414, the first light 102 is fully utilized to provide an image on the screen 113.

In other implementations, two lights of two different wavelengths different colors) may be provided to two separate etendue splitter components. For example, a first light is split into a first etendue component and a second etendue component, and a second light is split into a third etendue component and a fourth etendue component. The first etendue component may then be combined with the fourth etendue component, and the second etendue component may then be combined with the third etendue component. Accordingly, lights of varying wavelengths and polarization states may be combined while still efficiently utilizing the high and low etendue components of each.

In some implementations, the projection system includes a plurality of different wavelengths, each wavelength provided to a color channel. Each color channel may comprise, for example, the components recited with respect to projection system 100. In this manner, each color channel may include its own PLM 105 and/or its own SLM 105'. Additionally, each color channel may include its own etendue splitter component 103. Alternatively, in some implementations, the same etendue splitter component 103 is shared for two or more color channels or for every color channel.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Various aspects of the present invention may be appreciated from the following enumerated example embodiments (EEEs):

EEE1. A projection system for etendue utilization, the projection system comprising:

a light source configured to emit a light, the light including a first etendue component and a second etendue component, wherein the first etendue component has a lower etendue than the second etendue component;

a first projection optics configured to project a first image on a screen;

a second projection optics configured to project a second image on the screen; and an etendue splitter component, the etendue splitter component configured to:

receive the light from the light source, extract, from the light, the first etendue component and the second etendue component, provide the first etendue component to the first projection optics, and provide the second etendue component to the second projection optics.

EEE2. The projection system of EEE 1, wherein the first projection optics are configured to project the first image using the first etendue component and the second projection optics are configured to project the second image using the second etendue component.

EEE3. The projection system of EEE 1 or EEE 2, wherein the etendue splitter component is reconfigurable into at least first and second states, wherein, in the first state, the etendue splitter component extracts a first fraction of the light as the first etendue component, wherein, in the second state, the etendue splitter component extracts a second fraction of the light as the first etendue component, and wherein the second fraction is greater than the first fraction.

EEE4. The projection system of EEE 3, wherein the etendue splitter component comprises a moving optical component and an actuator and wherein the actuator is configured to move the moving optical component as part of reconfiguring the etendue splitter component into at least the first and second states.

EEE5. The projection system of EEE 3 or EEE 4, wherein the etendue splitter component comprises an electrically-controlled optical component and a controller and wherein the controller is configured to adjust the electrically-controlled optical component as part of reconfiguring the etendue splitter component into at least the first and second states.

EEE6. The projection system of any of EEEs 1-5, wherein the etendue splitter component comprises:

a mirror configured to reflect the first etendue component and configured to pass the second etendue component.

EEE7. The projection system of EEE 6, wherein the mirror includes a center configured to pass the second etendue component, and wherein the aspect ratio of the center is the same as the aspect ratio of a modulator configured to receive the second etendue component.

EEE8. The projection system of any of EEEs 1-7, wherein the etendue splitter component comprises:

a first axicon and a second axicon, wherein the first and second axicons are each configured to direct a portion of the first etendue component to the first projection optics.

EEE9. The projection system of any of EEEs 1-8, wherein the light source is an array composed of a plurality of sources, wherein a first subset of the plurality of sources is configured to project the first etendue component, and wherein a second subset of the plurality of sources is configured to project the second etendue component.

EEE10. A projection system for etendue utilization, the projection system comprising:

a light source configured to emit a first light having a first amount of etendue;

a projection device configured to project a first image on a screen; and at least one optical component configured to:

receive the first light;

extract a second light having a second amount of etendue lower than the first amount of etendue; and provide the second light to the projection device.

EEE11. The projection system of EEE 10, wherein the projection device comprises a light modulator that has a first aspect ratio and receives the second light and wherein the at least one optical component has a second aspect ratio substantially similar to the first aspect ratio.

EEE12. The projection system of EEE 10 or EEE 11, wherein the at least one optical component is configured to split the first light into the second light and third light, wherein the third light has a third amount of etendue higher than the first amount of etendue, and wherein the at least one optical component is configured to absorb at least a portion of the third light.

EEE13. The projection system of any of EEEs 10-12, further comprising a mirror configured to extract the second light by reflecting a portion of the first light.

EEE14. A projection system for etendue utilization, the projection system comprising:

a light source configured to emit a first light having a first etendue;

an etendue component, wherein the etendue component is configured to receive the first light and extract, from the first light, a second light having a second etendue and a third light having a third etendue, wherein the second etendue is lower than the first etendue, and wherein the first etendue is lower than the third etendue;

a first light modulator configured to receive the second light, to modulate the second light a manner associated with a first image, and to output the modulated second light; and a second light modulator configured to receive the modulated second light from the first light modulator and to receive the third light from the etendue component, to modulate the third light and additionally modulate the modulated second light in a manner associated with the first image, and to output the modulated third light and additionally modulated. second light.

EEE15. The projection system of EEE 14, further comprising at least one optical component configured to receive the output of the second light modulator and project the first image onto a screen.

EEE16. The projection system of EEE 14 or EEE 15, wherein the first light modulator comprises a beam steering device.

EEE17. The projection system of any of EEEs 14-16, wherein the first light modulator comprises a plurality of digital mirrors and wherein the second light modulator comprises a second plurality of digital mirrors.

EEE18. The projection system of any of EEEs 14-17, wherein the first light modulator comprises a MEMS array and wherein the second light modulator comprises a DMD array.

EEE19. The projection system of any of EEEs 14-18, wherein the first light modulator has a larger number of pixel elements than the second light modulator.

EEE20. The projection system of any of EEEs 14-19, wherein the first and second light modulators have the same number of pixel elements.

EEE21. A method for etendue utilization within a projection system, the projection system including a light source configured to emit a light, the light including a first etendue component and a second etendue component, wherein the first etendue component has a lower etendue than the second etendue component, a first projection optics configured to project a first image on a screen, a second projection optics configured to project a second image on the screen, and an etendue splitter component, the method comprising:

receiving the light from the light source, extracting, from the light, the first etendue component and the second etendue component, providing the first etendue component to the first projection optics, and providing the second etendue component to the second projection optics.

EEE22. The method of EEE 21, wherein the etendue splitter component is reconfigurable into at least first and second states, wherein, in the first state, the etendue splitter component extracts a first fraction of the light as the first etendue component, wherein, in the second state, the etendue splitter component extracts a second fraction of the light as the first etendue component, and wherein the second fraction is greater than the first fraction.

EEE23. The method of EEE 22, wherein the etendue splitter component comprises a moving optical component and an actuator and wherein the method includes moving the moving optical component as part of reconfiguring the etendue splitter component into at least the first and second states.

EEE24. A non-transitory computer-readable medium storing instructions that, when executed by a processor of a projection system, cause the projection system to perform operations comprising the method according to any of EEEs 21-23.

The invention claimed is:

1. A projection system for etendue utilization, the projection system comprising:

a light source configured to emit a light, the light including a first etendue component and a second etendue component, wherein the first etendue component has a lower etendue than the second etendue component;

a first projection optics configurable to project an image on a screen;

a second projection optics configurable to project an image on a screen; and an etendue splitter component, the etendue splitter component configured to:

receive the light from the light source, extract, from the light, the first etendue component and the second etendue component, provide the first etendue component to the first projection optics, and provide the second etendue component to the second projection optics, wherein the first projection optics are configured to project a first image using the first etendue component and the second projection optics are configured to project a second image using the second etendue component.

2. The projection system of claim 1, wherein the projection system comprises a phase light modulator receiving one of the first etendue component and the second etendue component, wherein the other of the first etendue component and the second etendue component bypasses the phase light modulator.

3. The projection system of claim 1, wherein the etendue splitter component is reconfigurable into at least first and second states, wherein, in the first state, the etendue splitter component extracts a first fraction of the light as the first etendue component, wherein, in the second state, the etendue splitter component extracts a second fraction of the light as the first etendue component, and wherein the second fraction is greater than the first fraction.

4. The projection system of claim 3, wherein the etendue splitter component comprises a moving optical component and an actuator and wherein the actuator is configured to move the moving optical component as part of reconfiguring the etendue splitter component into at least the first and second states.

5. The projection system of claim 3, wherein the etendue splitter component comprises an electrically-controlled optical component and a controller and wherein the controller is configured to adjust the electrically-controlled optical component as part of reconfiguring the etendue splitter component into at least the first and second states.

6. The projection system of claim 1, wherein the etendue splitter component comprises:

a mirror configured to reflect the first etendue component and configured to pass the second etendue component.

7. The projection system of claim 6, wherein the mirror includes a center configured to pass the second etendue component, and wherein the aspect ratio of the center is the same as the aspect ratio of a modulator configured to receive the second etendue component.

8. The projection system of claim 1, wherein the etendue splitter component comprises:

a first axicon and a second axicon, wherein the first and second axicons are each configured to direct a portion of the first etendue component to the first projection optics.

9. The projection system of claim 1, wherein the light source is an array composed of a plurality of sources, wherein a first subset of the plurality of sources is configured to project the first etendue component, and wherein a second subset of the plurality of sources is configured to project the second etendue component.

10. A projection system for etendue utilization, the projection system comprising:

a light source configured to emit a first light having a first amount of etendue;

a projection device configurable to project an image on a screen; and at least one optical component configured to:

receive the first light;

extract a second light having a second amount of etendue lower than the first amount of etendue; and provide the second light to the projection device, wherein the optical component includes a mirror configured to extract the second light by reflecting a portion of the first light.

11. The projection system of claim 10, wherein the projection device comprises a light modulator that has a first aspect ratio and receives the second light and wherein the mirror includes a hole, the hole having a second aspect ratio substantially similar to the first aspect ratio.

12. A projection system for etendue utilization, the projection system comprising:

a light source configured to emit a first light having a first etendue;

an etendue component, wherein the etendue component is configured to receive the first light and extract, from the first light, a second light having a second etendue and a third light having a third etendue, wherein the second etendue is lower than the first etendue, and wherein the first etendue is lower than the third etendue;

a first light modulator configured to receive the second light, to modulate the second light in a manner associated with a first image, and to output the modulated second light; and a second light modulator configured to receive the modulated second light from the first light modulator and to receive the third light from the etendue component, to modulate the third light and additionally modulate the modulated second light in a manner associated with the first image, and to output the modulated third light and additionally modulated second light.

13. The projection system of claim 12, further comprising at least one optical component configured to receive the output of the second light modulator and project the first image onto a screen.

14. The projection system of claim 12, wherein the first light modulator comprises a beam steering device.

15. The projection system of claim 12, wherein the first light modulator comprises a plurality of digital mirrors and wherein the second light modulator comprises a second plurality of digital mirrors.

16. The projection system of claim 12, wherein the first light modulator comprises a MEMS array and wherein the second light modulator comprises a DMD array.

17. The projection system of claim 12, wherein the first light modulator has a larger number of pixel elements than the second light modulator.

18. The projection system of claim 12, wherein the first and second light modulators have the same number of pixel elements.

* * * * *